United States Patent
Kim et al.

(10) Patent No.: US 12,402,122 B2
(45) Date of Patent: Aug. 26, 2025

(54) METHOD AND APPARATUS FOR PERFORMING UPLINK TRANSMISSION OR RECEPTION IN WIRELESS COMMUNICATION SYSTEM

(71) Applicant: LG ELECTRONICS INC., Seoul (KR)

(72) Inventors: Hyungtae Kim, Seoul (KR); Duckhyun Bae, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 678 days.

(21) Appl. No.: 17/707,876

(22) Filed: Mar. 29, 2022

(65) Prior Publication Data

US 2022/0330292 A1 Oct. 13, 2022

(30) Foreign Application Priority Data

Mar. 30, 2021 (KR) ........................ 10-2021-0041376

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0048* (2013.01); *H04W 72/23* (2023.01)

(58) Field of Classification Search
CPC .......................... H04W 72/1268; H04W 72/23
See application file for complete search history.

(56) References Cited

U.S. PATENT DOCUMENTS

| | | |
|---|---|---|
| 2018/0199360 A1 | 7/2018 | Lin et al. |
| 2019/0174446 A1 | 6/2019 | Zhang et al. |
| 2022/0132555 A1* | 4/2022 | Blankenship ......... H04W 72/23 |

(Continued)

FOREIGN PATENT DOCUMENTS

WO 2020167238 8/2020

OTHER PUBLICATIONS

3rd Generation Partnership Project (3GPP), "Technical Specification Group Radio Access Network; NR; Physical layer procedures for data (Release 16)," 3GPP TS 38.214 V16.4.0, Jan. 2021, 171 pages.

(Continued)

*Primary Examiner* — Rhonda L Murphy
(74) *Attorney, Agent, or Firm* — LEE, HONG, DEGERMAN, KANG & WAIMEY

(57) ABSTRACT

A method and an apparatus for performing uplink transmission/reception in a wireless communication system are disclosed. A method for performing communication by a user equipment (UE) according to an embodiment of the present disclosure includes receiving configuration information including information related to uplink transmission based on a configured grant (CG) from a base station; and based on the configuration information, performing an initial uplink transmission of a transport block (TB) in a first transmission occasion (TO) associated with a redundancy version (RV) which is 0 among a plurality of TOs, and the plurality of TOs correspond to a first sounding reference signal (SRS) resource set and a second SRS resource set.

10 Claims, 12 Drawing Sheets

(56) References Cited

U.S. PATENT DOCUMENTS

2023/0063015 A1* 3/2023 Muruganathan ...... H04L 5/0035

OTHER PUBLICATIONS

3rd Generation Partnership Project (3GPP), "Technical Specification Group Radio Access Network; NR; Medium Access Control (MAC) protocol specification (Release 16)," 3GPP TS 38.321 V16.4.0, Mar. 2021, 158 pages.
PCT International Application No. PCT/KR2022/004072, International Search Report dated Jul. 12, 2022, 3 pages.

* cited by examiner

METHOD AND APPARATUS FOR PERFORMING UPLINK TRANSMISSION OR RECEPTION IN WIRELESS COMMUNICATION SYSTEM

CROSS-REFERENCE TO RELATED APPLICATIONS

Pursuant to 35 U.S.C. § 119, this application claims the benefit of earlier filing date and right of priority to Korean Application No. 10-2021-0041376, filed on Mar. 30, 2021, the contents of which are all incorporated by reference herein in their entirety.

TECHNICAL FIELD

The present disclosure relates to a wireless communication system, and more particularly, to a method and apparatus for performing uplink transmission/reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and apparatus for performing uplink transmission/reception in a wireless communication system.

In addition, an additional technical object of the present disclosure is to provide a method and apparatus for transmitting and receiving an initial uplink transmission in a first TO related to a specific RV, when uplink transmission/reception is performed based on an uplink grant configured in a wireless communication system.

The technical objects to be achieved by the present disclosure are not limited to the above-described technical objects, and other technical objects which are not described herein will be clearly understood by those skilled in the pertinent art from the following description.

Technical Solution

As an embodiment of the present disclosure, a method for performing uplink transmission by a user equipment (UE) in a wireless communication system may include receiving configuration information including information related to uplink transmission based on a configured grant (CG) from a base station; and based on the configuration information, performing an initial uplink transmission of a transport block (TB) in a first transmission occasion (TO) associated with a redundancy version (RV) which is 0 among a plurality of TOs, and the plurality of TOs correspond to a first sounding reference signal (SRS) resource set and a second SRS resource set.

As an embodiment of the present disclosure, a method for performing uplink reception by a base station in a wireless communication system may include transmitting configuration information including information related to uplink transmission based on a configured grant (CG) to a user equipment (UE); and based on the configuration information, performing an initial uplink reception of a transport block (TB) in a first transmission occasion (TO) associated with a redundancy version (RV) which is 0 among a plurality of TOs, and the plurality of TOs correspond to a first sounding reference signal (SRS) resource set and a second SRS resource set.

Technical Effects

According to an embodiment of the present disclosure, a method and an apparatus for performing uplink transmission/reception may be provided in a wireless communication system.

In addition, according to an embodiment of the present disclosure, when uplink transmission/reception is performed based on an uplink grant configured in a wireless communication system, a method and an apparatus for transmitting and receiving an initial uplink transmission in a first TO related to a specific RV may be provided.

In addition, according to an embodiment of the present disclosure, since both uplink transmission and reception are possible in the TO corresponding to a plurality of SRS resource sets, latency for uplink transmission may be reduced.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
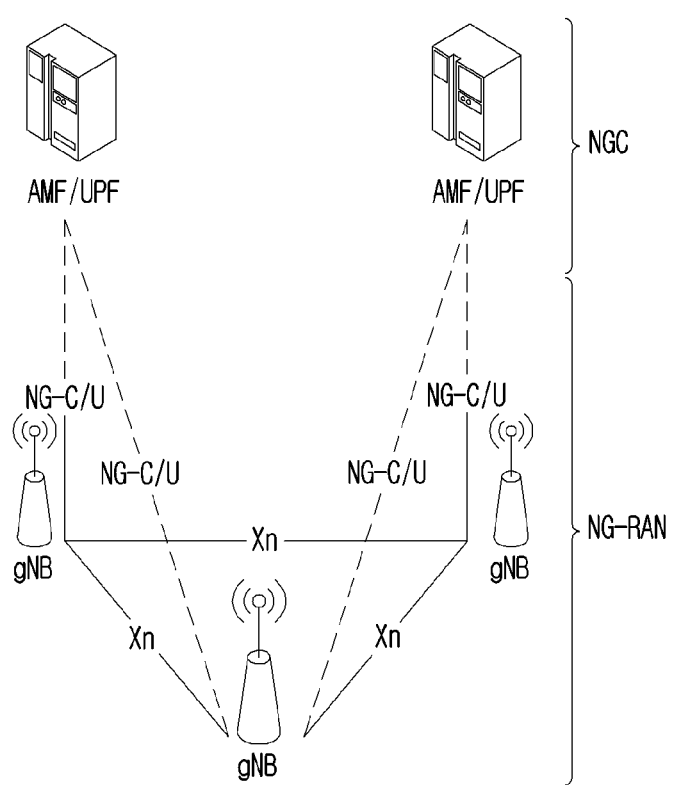
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
 BM: beam management
 CQI: Channel Quality Indicator
 CRI: channel state information-reference signal resource indicator
 CSI: channel state information
 CSI-IM: channel state information-interference measurement
 CSI-RS: channel state information reference signal
 DMRS: demodulation reference signal
 FDM: frequency division multiplexing
 FFT: fast Fourier transform
 IFDMA: interleaved frequency division multiple access
 IFFT: inverse fast Fourier transform
 L1-RSRP: Layer 1 reference signal received power
 L1-RSRQ: Layer 1 reference signal received quality
 MAC: medium access control
 NZP: non-zero power
 OFDM: orthogonal frequency division multiplexing
 PDCCH: physical downlink control channel
 PDSCH: physical downlink shared channel
 PMI: precoding matrix indicator
 RE: resource element
 RI: Rank indicator
 RRC: radio resource control
 RSSI: received signal strength indicator
 Rx: Reception
 QCL: quasi co-location
 SINR: signal to interference and noise ratio
 SSB (or SS/PBCH block): Synchronization signal block (including PSS (primary synchronization signal), SSS (secondary synchronization signal) and PBCH (physical broadcast channel))
 TDM: time division multiplexing
 TRP: transmission and reception point
 TRS: tracking reference signal
 Tx: transmission
 UE: user equipment
 ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
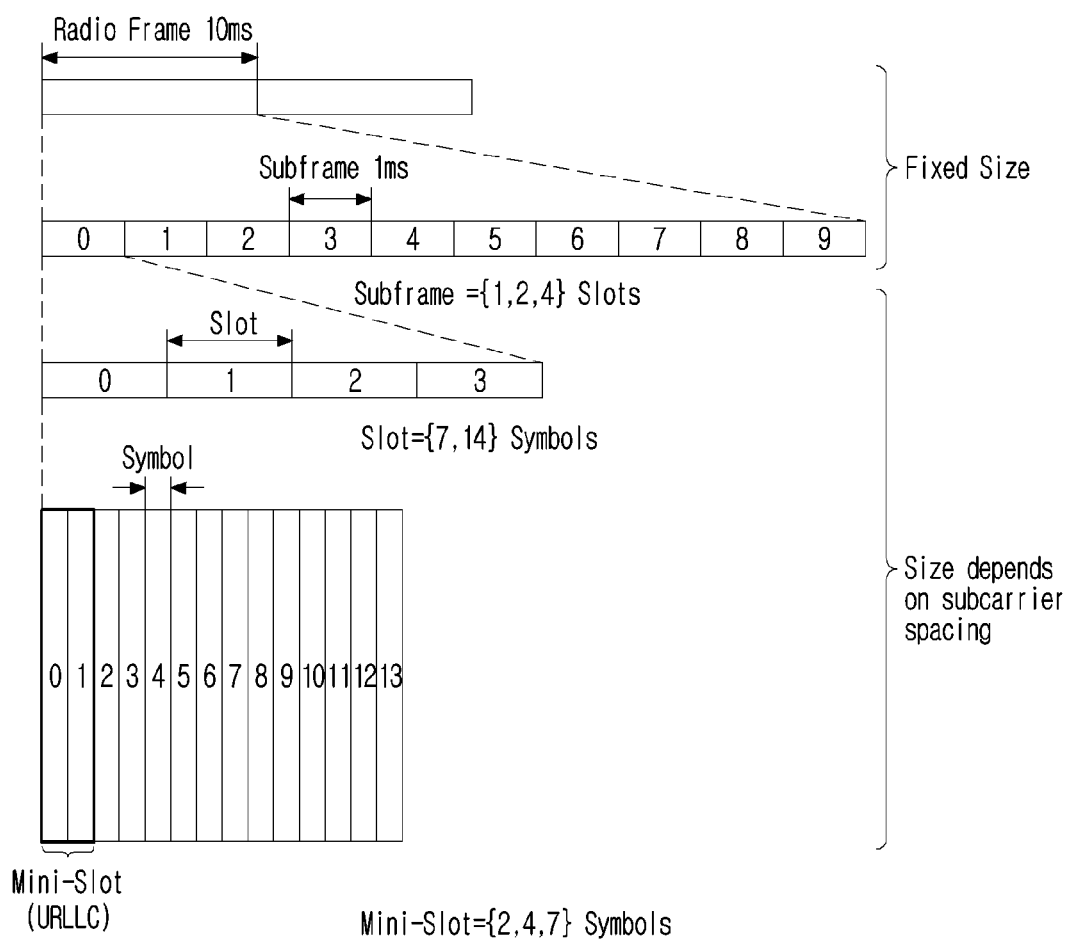
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·$10^3$ Hz and $N_f$ is 4096. Downlink and uplink transmission is configured (organized) with a radio frame having a duration of $T_f=1/(\Delta f_{max} \cdot N_f/100) \cdot T_c=10$ ms. Here, a radio frame is configured with subframes having a duration of $T_{sf}=(\Delta f_{max} \cdot N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame,μ}$ | $N_{slot}^{subframe,μ}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

Figure 3:
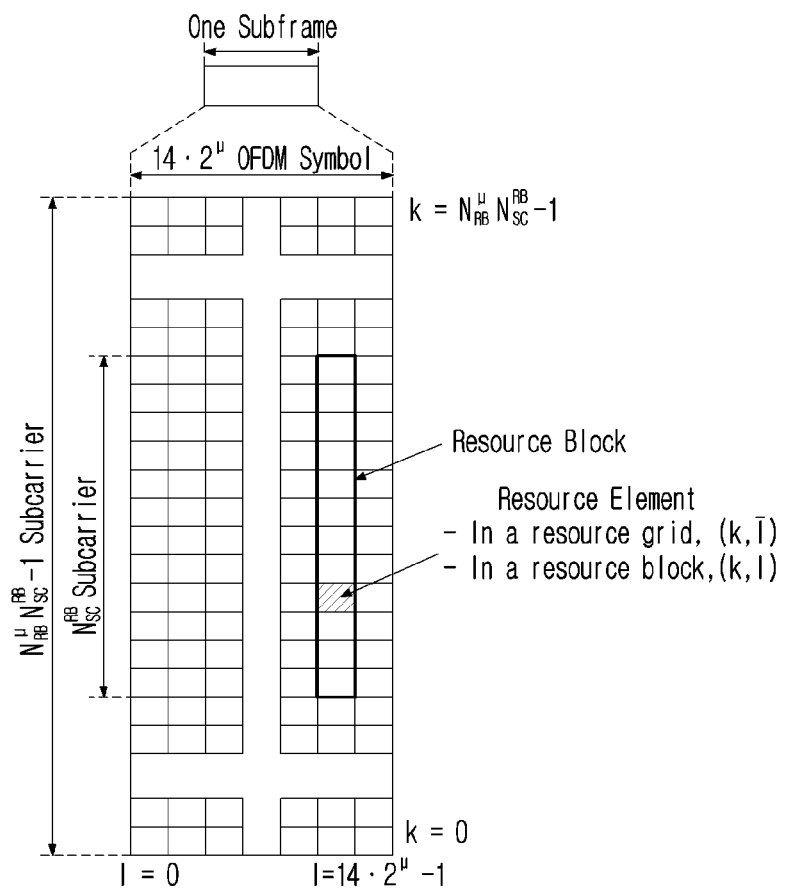
FIG. 3 illustrates a resource grid in a wireless communication system to which the present disclosure may be applied.

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^μ N_{sc}^{RB}$ subcarriers in a frequency domain and one subframe is configured with 14·$2^μ$ OFDM symbols, but it is not limited thereto. In an NR system, a transmitted signal is described by OFDM symbols of $2^μ N_{symb}^{(μ)}$ and one or more resource grids configured with $N_{RB}^μ \leq N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^μ N_{sc}^{RB}-1$ is an index in a frequency domain and l'=0, . . . , $2^μ N_{symb}^{(μ)}-1$ refers to a position of a symbol in a subframe. When referring to a resource element in a slot, an index pair (k,l) is used. Here, l=0, . . . , $N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain. Point A plays a role as a common reference point of a resource block grid and is obtained as follows. offsetToPointA for a primary cell (PCell) downlink represents a frequency offset between point A and the lowest subcarrier of the lowest resource block overlapped with a SS/PBCH block which is used by a terminal for an initial cell selection.

It is expressed in resource block units assuming a 15 kHz subcarrier spacing for FR1 and a 60 kHz subcarrier spacing for FR2. absoluteFrequencyPointA represents a frequency-position of point A expressed as in ARFCN (absolute radio-frequency channel number).

Common resource blocks are numbered from 0 to the top in a frequency domain for a subcarrier spacing configuration µ. The center of subcarrier 0 of common resource block 0 for a subcarrier spacing configuration p is identical to 'point A'. A relationship between a common resource block number $n_{CRB}^{\mu}$ and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
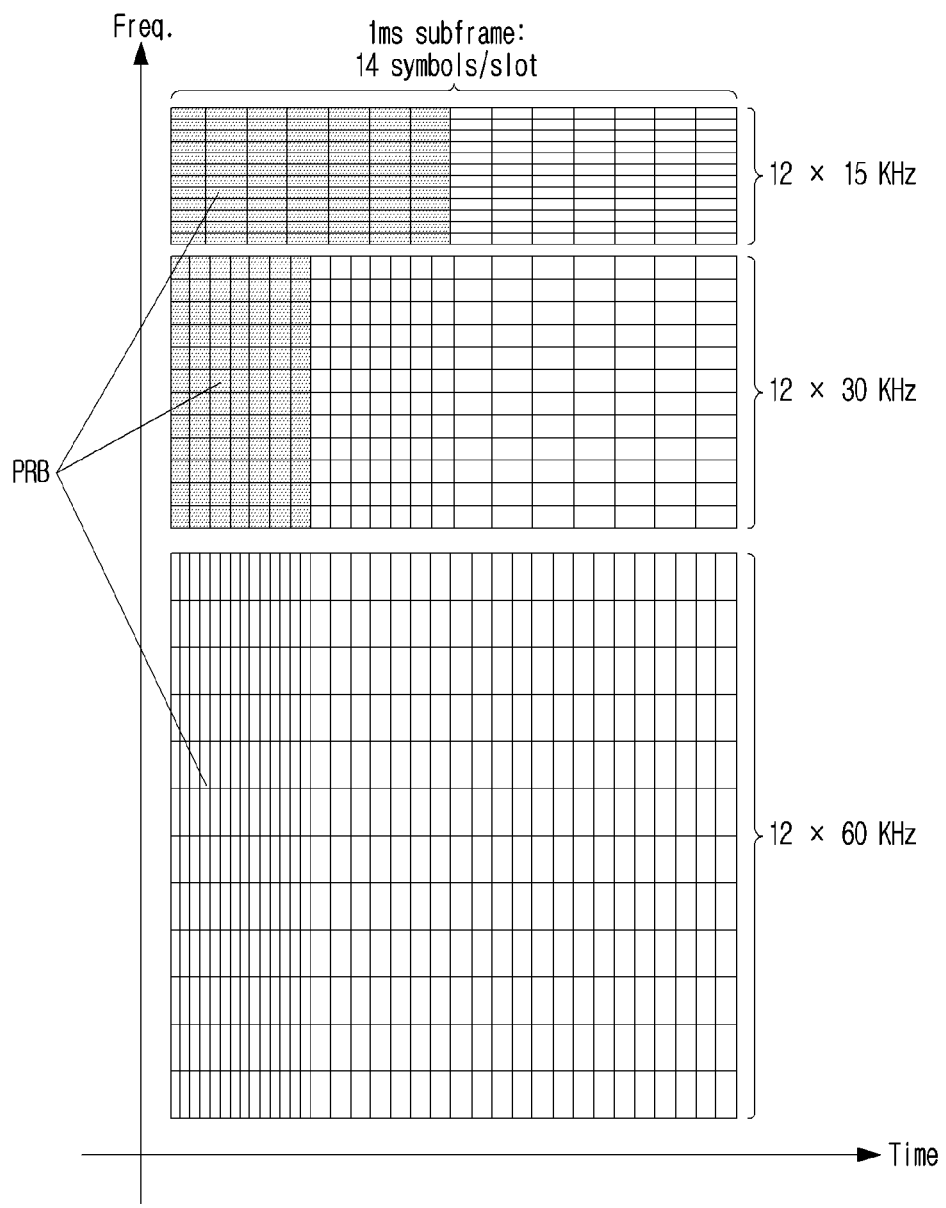
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
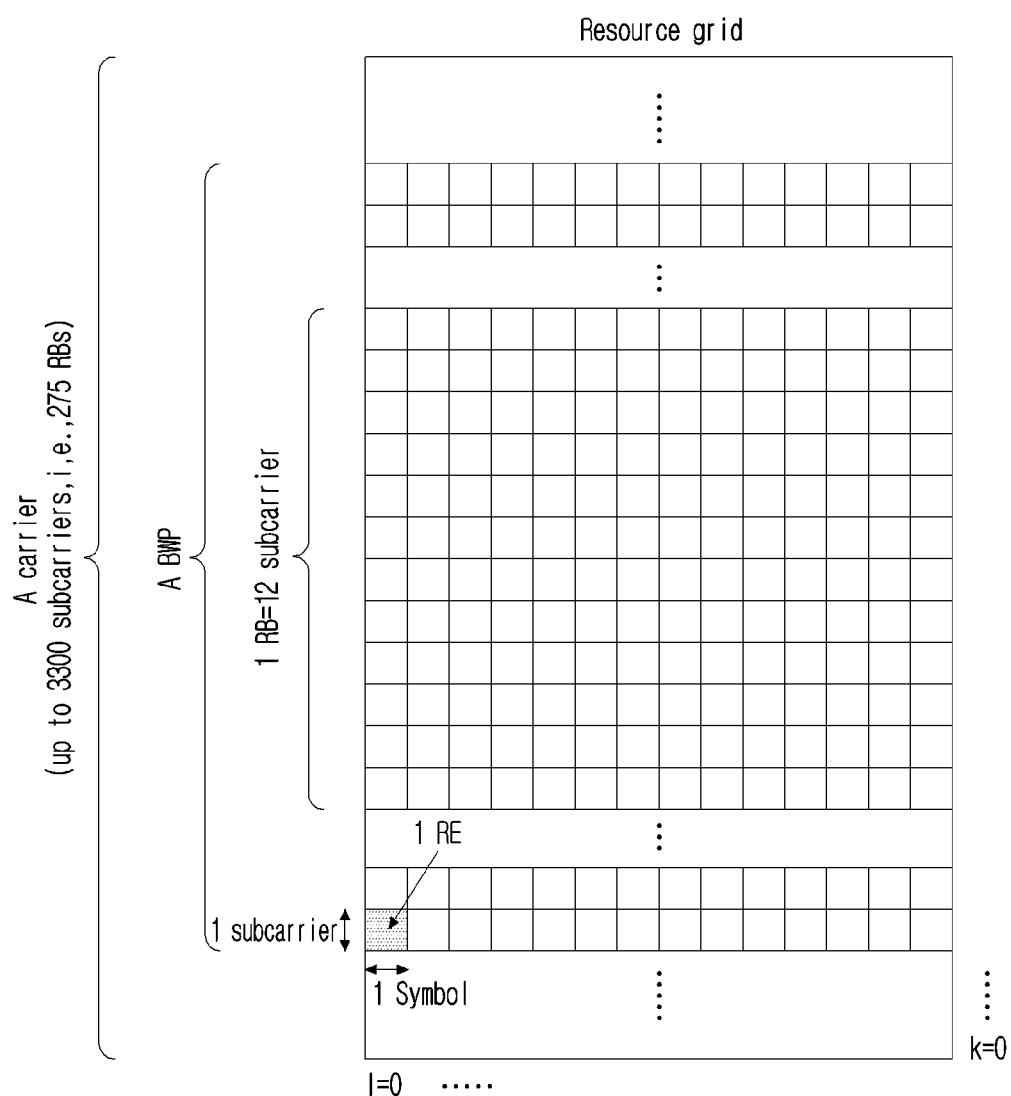
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
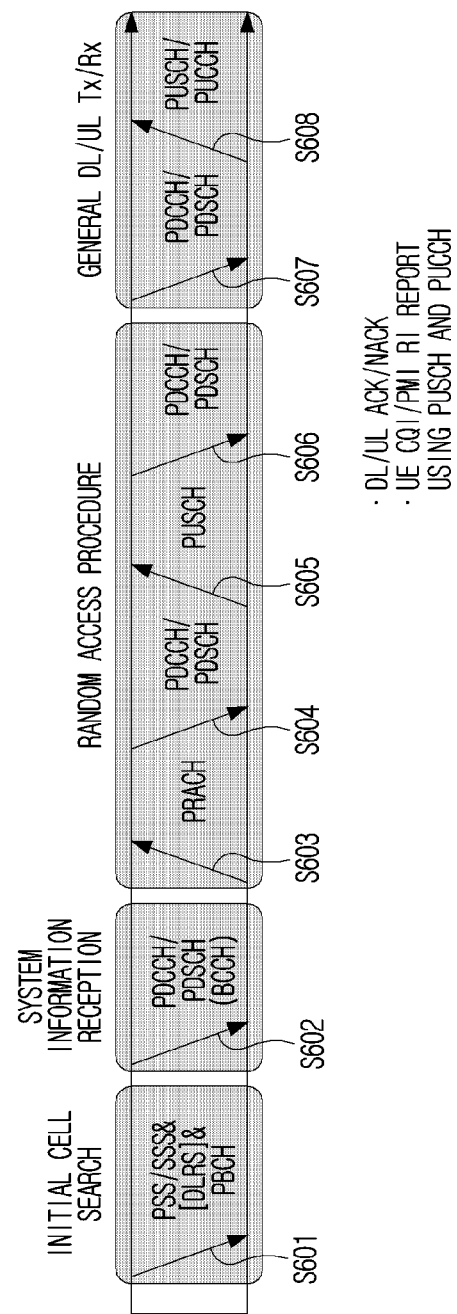
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted. Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
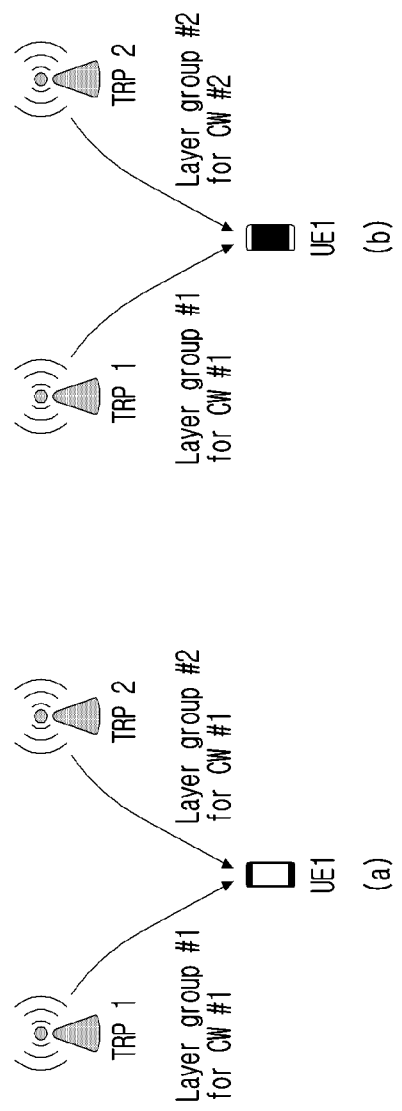
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be extended and applied to a frequency division multiplexing (FDM) method based on different frequency domain resources (e.g., RB/PRB (set), etc.) and/or a time division multiplexing (TDM) method based on different time domain resources (e.g., slots, symbols, sub-symbols, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot
  1-a) Method 1a.
    The same TB is transmitted in one layer or layer set at each transmission time (occasion) and each layer or each layer set is associated with one TCI and one set of DMRS port(s).
    A single codeword having one RV is used in all spatial layers or all layer sets. With regard to UE, different coded bits are mapped to a different layer or layer set by using the same mapping rule
  1-b) Method 1b
    The same TB is transmitted in one layer or layer set at each transmission time (occasion) and each layer or each layer set is associated with one TCI and one set of DMRS port(s).
    A single codeword having one RV is used in each spatial layer or each layer set. RV(s) corresponding to each spatial layer or each layer set may be the same or different.
  1-c) Method 1c
    The same TB having one DMRS port associated with multiple TCI state indexes is transmitted in one layer at one transmission time (occasion) or the same TB having multiple DMRS ports one-to-one associated with multiple TCI state indexes is transmitted in one layer.
    In case of the above-described method 1a and 1c, the same MCS is applied to all layers or all layer sets.

2) Method 2 (FDM): Frequency Resource Allocation is not Overlapped and n (n<=Nf) TCI States in a Single Slot
    Each non-overlapping frequency resource allocation is associated with one TCI state.
    The same single/multiple DMRS port(s) are associated with all non-overlapping frequency resource allocation.
  2-a) Method 2a
    A single codeword having one RV is used for all resource allocation. With regard to UE, common RB matching (mapping of a codeword to a layer) is applied to all resource allocation.
  2-b) Method 2b
    A single codeword having one RV is used for each non-overlapping frequency resource allocation. A RV corresponding to each non-overlapping frequency resource allocation may be the same or different.
    For the above-described method 2a, the same MCS is applied to all non-overlapping frequency resource allocation.

3) Method 3 (TDM): Time Resource Allocation is not Overlapped and n (n<=Nt1) TCI States in a Single Slot
    Each transmission time (occasion) of a TB has time granularity of a mini-slot and has one TCI and one RV.
    A common MCS is used with a single or multiple DMRS port(s) at all transmission time (occasion) in a slot.
    A RV/TCI may be the same or different at a different transmission time (occasion).

4) Method 4 (TDM): n (n<=Nt2) TCI States in K (n<=K) Different Slots
    Each transmission time (occasion) of a TB has one TCI and one RV.
    All transmission time (occasion) across K slots uses a common MCS with a single or multiple DMRS port(s).
    A RV/TCI may be the same or different at a different transmission time (occasion).

Downlink Multiple TRP (M-TRP) URLLC Transmission Operation

DL MTRP URLLC transmission method means that multiple TRPs transmit the same data/DCI by using a different space (e.g., layer, port)/time/frequency resource. For example, TRP 1 transmits the specific data/DCI in resource 1 and TRP 2 transmits the specific data/DCI (i.e., same data/DCI) in resource 2

UE configured with a DL MTRP-URLLC transmission method receives the same data/DCI by using a different layer/time/frequency resource. Here, UE may receive an indication of the QCL RS/type (i.e., DL TCI state) used in the space/time/frequency resource for receiving the corresponding data/DCI from the base station.

For example, when the data/DCI is received in resource 1 and resource 2, a DL TCI state used in resource 1 and a DL TCI state used in resource 2 may be indicated. UE may achieve high reliability because it receives the data/DCI through resource 1 and resource 2. Such DL MTRP URLLC may be applied to a PDSCH/a PDCCH.

UL MTRP-URLLC transmission method means that multiple TRPs receive the same data/UCI from any UE by using a different space/time/frequency resource. For example, TRP 1 may receive the same data/DCI from UE in resource 1 and TRP 2 may receive the same data/DCI from UE in resource 2. And, TRP 1 and TRP 2 may share data/UCI received from the UE through a backhaul link (connected between TRPs).

That is, UE configured with a UL MTRP-URLLC transmission method may transmit the same data/UCI by using a different space/time/frequency resource. Here, the UE may be indicated by the base station for a Tx beam and Tx power (i.e., UL TCI state) to be used in space/time/frequency resources for transmitting the same data/UCI. For example, when the same data/UCI is transmitted in resource 1 and resource 2, the UE may be indicated by the base station to indicate the UL TCI state used in resource 1 and the UL TCI state used in resource 2 from the base station. This UL M-TRP URLLC may be applied to PUSCH/PUCCH.

In addition, in describing the present disclosure, when receiving/transmitting data/DCI/UCI through a specific space/time/frequency resource, using (or mapping) a specific TCI state (or TCI) may mean that, for DL, estimating a channel from the DMRS using the QCL type and QCL RS indicated by a specific TCI state in a specific space/time/frequency resource, and receiving/demodulating data/DCI/UCI with the estimated channel.

In addition, when receiving/transmitting data/DCI/UCI through a specific space/time/frequency resource, using (or mapping) a specific TCI state (or, TCI) may mean that, for UL, DMRS and data/UCI are transmitted/modulated using a Tx beam and/or Tx power indicated by a specific TCI state in a specific space/time/frequency resource.

And, the UL TCI state may include Tx beam or Tx power information of the UE. In addition, the base station may configure spatial relation information or the like for the UE through other parameters instead of the TCI state.

For example, the UL TCI state may be directly indicated to the UE through a UL grant DCI. Alternatively, the UL TCI state may mean spatial relationship information of an SRS resource indicated through an SRS resource indicator (SRI) field of a UL grant DCI. Alternatively, the UL TCI state may mean an open loop (OP) Tx power control parameter connected to a value indicated through the SRI field of the UL grant DCI.

Here, the OL Tx power control parameter may include, for example, j (index and alpha for OP parameter(s) Po (maximum 32 parameter values set per cell), q d (index of DL RS resources for PL (path loss) measurement (up to 4 measurements per cell), or/and I (closed loop power control process index (up to 2 processes per cell)).

As another embodiment of the present disclosure, the M-TRP eMBB transmission method refers to a method in which M-TRP transmits different data/DCI using different space/time/frequency resources. If the M-TRP eMBB transmission method is configured, it may be assumed that the UE receives a plurality of TCI states from the base station through DCI, and that data received using QCL RSs indicated by each of the plurality of TCI states are different from each other.

In addition, since the RNTI for M-TRP URLLC and the M-TRP eMBB RNTI are separately used, the UE may determine whether a specific transmission/reception is M-TRP URLLC transmission/reception or M-TRP eMBB transmission/reception. For example, when RNTI for URLLC is used and CRC masking is performed for DCI, the UE may determine the corresponding transmission as URLLC transmission. In addition, when the RNTI for eMBB is used and CRC masking is performed for DCI, the UE may determine the corresponding transmission as eMBB transmission. As another example, the base station may configure the M-TRP URLLC transmission/reception method or the M-TRP eMBB transmission/reception method to the UE through new signaling.

For convenience of description of the present disclosure, it has been assumed that 2 TRPs cooperate with each other to perform a transmission/reception operation, but the present disclosure is not limited thereto. That is, the present disclosure may be extended and applied even in a multi-TRP environment of 3 or more, and may be extended and applied even in an environment in which transmission/reception is performed in different panels or beams in the same TRP. The UE may recognize different TRPs as different TCI states. That the UE transmits/receives data/DCI/UCI using TCI state 1 means that it transmits/receives data/DCI/UCI/ from TRP 1 (or to TRP 1).

The present disclosure may be utilized in a situation in which the M-TRP cooperatively transmits the PDCCH (repetitively transmits or divides the same PDCCH). In addition, the present disclosure may be utilized in a situation in which M-TRP cooperatively transmits PDSCH or cooperatively receives PUSCH/PUCCH.

In addition, in describing the present disclosure, repeatedly transmitting the same PDCCH by a plurality of base stations (M-TRP) may mean transmitting the same DCI through a plurality of PDCCH candidates and has the same meaning that multiple base stations repeatedly transmit the same DCI. Here, two DCIs having the same DCI format/size/payload may be viewed as the same DCI.

Alternatively, if the scheduling results are the same even if the payloads of the two DCIs are different, the two DCIs may be regarded as the same DCI. For example, the time domain resource allocation (TDRA) field of DCI may relatively determine the slot/symbol position of data and the slot/symbol position of A (ACK)/N(NACK) based on the reception time of the DCI.

In this case, when the DCI received at time n and the DCI received at time n+1 indicate the same scheduling result to the UE, the TDRA fields of the two DCIs are different, and as a result, the DCI payload is different from each other. Accordingly, even if the payloads of the two DCIs are different, if the scheduling results are the same, the two DCIs may be regarded as the same DCI. Here, the number of repetitions R may be directly indicated by the base station to the UE or mutually promised.

Alternatively, even if the payloads of the two DCIs are different and the scheduling results are not the same, when the scheduling result of one DCI is a subset of the scheduling result of the other DCI, the two DCIs may be regarded as the same DCI.

For example, if the same data is TDM and repeatedly transmitted N times, DCI 1 received before the first data indicates (or schedules) repetition of data N times, and DCI 2 received before the second data indicates repetition (scheduling) of data N−1. In this case, the scheduling result (or data) of DCI 2 becomes a subset of the scheduling result (or data) of DCI 1, and both DCIs have scheduling results for the same data. Accordingly, even in this case, the two DCIs may be regarded as the same DCI.

And, in describing the present disclosure, dividing and transmitting the same PDCCH by a plurality of base stations may mean that one DCI is transmitted through one PDCCH candidate, but TRP 1 transmits some resources defined for the corresponding PDCCH candidate and TRP 2 transmits the remaining resources.

For example, when TRP 1 and TRP 2 divide and transmit PDCCH candidates corresponding to aggregation level m1+m2, a PDCCH candidate may be divided into PDCCH candidate 1 corresponding to aggregation level m1 and PDCCH candidate 2 corresponding to aggregation level m2, TRP 1 may transmit PDCCH candidate 1, and TPR 2 may transmit PDCCH candidate 2. In this case, TRP 1 and TRP 2 may transmit PDCCH candidate 1 and PDCCH candidate 2 using different time/frequency resources. After receiving the PDCCH candidate 1 and the PDCCH candidate 2, the UE may generate a PDCCH candidate corresponding to the aggregation level m1+m2 and attempt DCI decoding.

In this case, the method in which the same DCI is divided and transmitted to several PDCCH candidates may be implemented in the following two methods.

The first method is a method in which DCI payload (e.g., control information+CRC) is encoded through one channel encoder (e.g., polar encoder) and divided into two TRPs and transmitted. That is, the first method means a method of dividing and transmitting the coded bits obtained according to the encoding result in two TRPs. Here, the entire DCI payload may be encoded in the coded bit transmitted by each TRP, but is not limited thereto, and only some DCI payloads may be encoded.

The second method divides the DCI payload (e.g., control information+CRC) into two DCIs (DCI 1 and DCI 2) and encodes each of them through a channel encoder (e.g., a polar encoder). Thereafter, each of the two TRPs may transmit a coded bit corresponding to DCI 1 and a coded bit corresponding to DCI 2 to the terminal.

That is, dividing/repeating the same PDCCH by a plurality of base stations (M-TRP) and transmitting over a plurality of monitoring occasions (MOs) may mean that 1) the coded bit encoding the entire DCI content of the corresponding PDCCH is repeatedly transmitted through each MO for each base station (S-TRP), 2) the coded bit encoding the entire DCI content of the corresponding PDCCH is divided into a plurality of parts, and each base station (S-TRP)

transmits different parts through each MO, or 3) the DCI content of the corresponding PDCCH is divided into a plurality of parts, and different parts are encoded for each base station (S-TRP) (that is, separately encoded) and transmitted through each MO.

Repeated/divided transmission of the PDCCH may be understood as transmitting the PDCCH multiple times over several transmission occasions (TO).

Here, TO may mean a specific time/frequency resource unit in which the PDCCH is transmitted. For example, when the PDCCH is transmitted multiple times (to a specific RB) over slots 1, 2, 3, and 4, TO may mean each slot. As another example, if the PDCCH is transmitted multiple times (in a specific slot) over RB sets 1, 2, 3, and 4, TO may mean each RB set. As another example, if the PDCCH is transmitted multiple times over different times and frequencies, TO may mean each time/frequency resource. In addition, the TCI state used for DMRS channel estimation may be set differently for each TO, and it may be assumed that the TOs in which the TCI state is set differently are transmitted by different TRPs/panels.

Repeatedly transmitting or dividing the PDCCH by a plurality of base stations may mean that the PDCCH is transmitted over multiple TOs, and the union of the TCI states configured in the corresponding TOs consists of two or more TCI states. For example, PDCCH transmitting over TO 1, 2, 3, 4 may mean that TCI states 1, 2, 3, 4 are configured in each of TO 1, 2, 3, 4 and TRP i cooperatively transmits the PDCCH in TO i.

In describing the present disclosure, repeatedly transmitting the same PUSCH to a plurality of base stations (i.e., M-TRP) by the UE may mean that the UE transmits the same data through a plurality of PUSCHs, and each PUSCH may be transmitted by being optimized for UL channels of different TRPs.

For example, the UE may repeatedly transmit the same data through PUSCH 1 and PUSCH 2. In this case, PUSCH 1 may be transmitted using UL TCI state 1 for TRP 1, and link adaptation such as precoder/MCS may also be scheduled to receive a value optimized for the channel of TRP 1 to transmit the PUSCH. PUSCH is transmitted using UL TCI state 2 for TRP 2, and link adaptation such as a precoder/MCS may also be scheduled for a value optimized for the channel of TRP 2 to transmit the PUSCH. In this case, the repeatedly transmitted PUSCH 1 and PUSCH 2 may be transmitted at different times to be TDM, FDM, or SDM.

In addition, in describing the present disclosure, transmitting, by UE to a plurality of base stations (i.e., M-TRP), the same PUSCH by dividing it may mean that one data is transmitted through one PUSCH, but the resources allocated to the PUSCH are divided and optimized for UL channels of different TRPs for transmission.

For example, the UE may transmit the same data through a 10-symbol PUSCH. At this time, the first 5 symbols among 10 symbols may be transmitted using UL TCI state 1 for TRP 1, and the UE may transmit a 5-symbol PUSCH (to TRP 1) by receiving a link adaptation such as precoder/MCS and scheduling a value optimized for a channel of TRP 1. The remaining 5 symbols may be transmitted using UL TCI state 2 for TRP 2, and the UE may transmit the remaining 5-symbol PUSCH (with TRP 2) by receiving a link adaptation such as precoder/MCS and scheduling a value optimized for the channel of TRP 2.

In the above example, a method of dividing one PUSCH into time resources and performing TDM transmission for TRP 1 and TRP 2 has been described. However, the present disclosure is not limited thereto, and the UE may divide and transmit the same PUSCH to a plurality of base stations by using the FDM/SDM method.

The UE may repeatedly transmit the PUCCH to a plurality of base stations (similar to PUSCH transmission) or divide and transmit the same PUCCH.

The present disclosure may be extended and applied to various channels such as PUSCH/PUCCH/PDSCH/PDCCH. In addition, the present disclosure may be extended and applied to both the case of repeatedly transmitting the channel in different space/time/frequency resources and the case of dividing the transmission.

Hereinafter, an operation performed by the UE will be described in detail with reference to FIG. 8.

Figure 8:
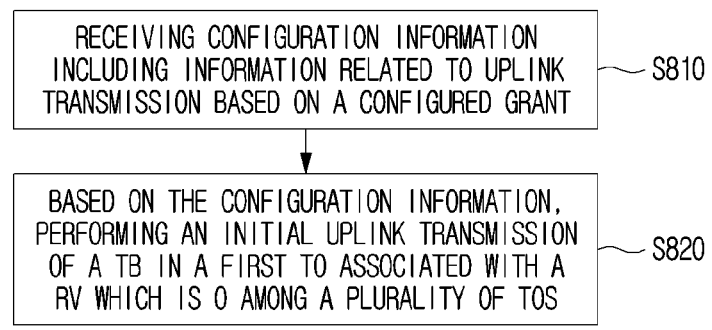
FIG. 8 is a diagram for describing an uplink transmission operation of a terminal in a wireless communication system to which the present disclosure may be applied.

FIG. 8 is a diagram for describing an uplink transmission operation of a terminal according to an embodiment of the present disclosure.

The UE may receive configuration information including information related to uplink transmission based on a configured grant (CG) from the base station (S810).

Here, the uplink transmission may include a physical uplink shared channel (PUSCH), but is not limited thereto, and may include a physical uplink control channel (PUCCH) and the like.

In addition, the type of CG-based uplink transmission may include type 1 CG PUSCH transmission or type 2 CG PUSCH transmission, but is not limited thereto.

When the type of CG-based uplink transmission is configured to type 2 CG PUSCH transmission, the CG PUSCH may be activated by DCI.

The UE may perform initial uplink transmission of a transport block (TB) in a first TO associated with a redundancy version (RV) of 0 (i.e., RV=0) among a plurality of transmission occasions (Tos) based on the configuration information (S820). That is, the UE may perform the first uplink transmission in the first TO among TOs corresponding to RV=0 in the plurality of TOs.

Here, an RV sequence {0, 2, 3, 1} may be configured for the UE. And, the plurality of TOs may be mapped to the RV sequence {0, 2, 3, 1}. That is, RV pattern 1 may be configured for the UE. However, this is only an embodiment, and the embodiment of the present disclosure may be extended and applied even when RV patterns 2 or 3 are configured.

The configuration information may include information (or an indicator) indicating whether to perform the initial uplink transmission of the TB in the first TO among the plurality of TOs.

For example, when the indicator (e.g., 'startingFromRV0') is configured to off, the initial uplink transmission of the TB may be (always) performed in the first TO. And, when the indicator (e.g., 'startingFromRV0') is configured to on, the first uplink transmission may be performed in the first TO corresponding to RV=0 among the plurality of TOs.

In addition, the UE may receive information for configuring a first sounding reference signal (SRS) resource set or a second SRS resource set from the base station. However, this is only an embodiment, and the UE may receive information for configuring two or more SRS resource sets from the base station. In this case, the first SRS resource set may correspond to TRP 1, and the second SRS resource set may correspond to TRP 2.

In addition, the plurality of TOs may correspond to a first sounding reference signal (SRS) resource set and a second SRS resource set.

In addition, the plurality of TOs may include a first TO set and a second TO set, the first TO set may correspond to the first SRS resource set, and the second TO set may correspond to the second SRS resource set. Each of the first TO set and the second TO set may include one or more TOs. And, in a first TO associated with an RV equal to 0 among one or more TOs included in the first TO set or a first TO associated with an RV equal to 0 among one or more TOs included in the second TO set, initial uplink transmission of the TB may be performed.

That is, the UE may perform the first uplink transmission in the first TO related to RV which is 0 among the TOs corresponding to TRP 1 (i.e., the first TO corresponding to RV=0), or may perform uplink transmission in the first TO related to RV which is 0 among the TOs corresponding to TRP 2 (i.e., the first TO corresponding to RV=0).

The UE may repeat uplink transmission in a plurality of TOs. In this case, the maximum number of repetitions (or the maximum number of TOs) of uplink transmission performed by the UE may be indicated/configured by one or more of DCI or RRC signaling.

Specifically, (e.g., when a type 2 CG PUSCH is configured), the maximum number of repetitions (N) of uplink transmission may be included in a start and length indicator value (SLIV) of a DCI for scheduling a CG PUSCH. Here, the maximum number of repetitions of uplink transmission indicated by DCI may be 16 or less, but is not limited thereto.

In addition, (e.g., when type 1 CG PUSCH is configured), the maximum number of repetitions of uplink transmission may be configured by RRC signaling (e.g., 'repK'). Here, the maximum number of repetitions of uplink transmission set by RRC signaling may be 8, but is not limited thereto.

Hereinafter, an operation performed by the base station will be described in detail with reference to FIG. 9.

Figure 9:
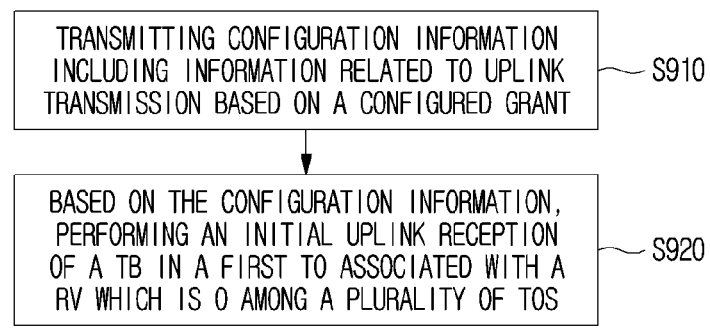
FIG. 9 is a diagram for describing an uplink reception operation of a base station in a wireless communication system to which the present disclosure may be applied.

FIG. 9 is a diagram for describing an uplink transmission operation of a base station according to an embodiment of the present disclosure.

The base station may transmit configuration information including information related to uplink transmission based on CG to the UE (S910). Since the description related to CG-based uplink transmission has been described in detail with reference to FIG. 8, a redundant description will be omitted.

The base station may transmit configuration information including information (or an indicator) indicating whether to perform the initial uplink transmission of the TB in the first TO among the plurality of TOs to the UE. Here, the base station may transmit configuration information to the UE through signaling (e.g., at least one of RRC signaling, MAC-CE, or DCI).

In addition, the base station may transmit information for configuring the first SRS resource set or the second SRS resource set to the UE.

Based on the configuration information, the UE may perform initial uplink reception of the TB in the first TO associated with the 0 RV among the plurality of TOs (S920). That is, the base station may perform initial uplink reception in the first TO among TOs corresponding to RV=0 in the plurality of TOs.

Here, since the description related to the plurality of TOs has been specifically described with reference to FIG. 8, the overlapping description will be omitted.

Hereinafter, an uplink transmission/reception process based on a configured grant (CG) in the M-TRP environment will be described in detail.

CG PUSCH Repeated Transmission/Reception Operation

The CG PUSCH may be configured as a type 1 CG PUSCH activated through RRC signaling or/and a type 2 CG PUSCH activated through DCI. In addition, the CG PUSCH may repeatedly transmit the same transport block (TB) up to N times, and the repeated transmission period may be configured to P.

For example, it is assumed that N is configured to 4 and P is configured to 10 slots. If repeated PUSCH transmission is performed in slots 0, 1, 2, and 3, repeated PUSCH transmission may be performed in slots 10, 11, 12, and 13, which are the following periods. After that, PUSCH transmission may be repeatedly transmitted in the next period.

Here, the initial transmission may be performed in slots 0 and 10, the operation in slot 0 may be repeated in slots 1, 2, and 3, and the operation in slot 10 may be repeated in slots 11, 12, and 13.

The TO of the initial transmission of the above-described CG PUSCH may vary according to a configured redundancy version (RV) pattern. For example, the RV pattern may be implemented as three patterns. For example, RV pattern 1 may be {0, 2, 3, 1}, RV pattern 2 may be {0, 3, 0, 3}, and RV pattern 3 may be {0, 0, 0, 0}.

For example, it is assumed that N is configured to 4 and RV pattern 1 is configured. That is, when the CG PUSCH transmits the same TB up to 4 times, there may be 4 TOs for CG PUSCH transmission. In addition, 0, 2, 3, and 1, which are RVs of RV pattern 1, may be sequentially mapped for each TO.

When RV pattern 1 is configured, initial transmission may be performed in the first TO among N TOs configured for repeated transmission. When RV patterns 2 and 3 are configured, initial transmission may be performed in one of TOs corresponding to RV=0 (i.e., TOs mapped to RVs having a value of 0) among N TOs configured for repeated transmission.

That is, when RV pattern 2 or 3 is configured, the UE may perform initial transmission in the TO corresponding to RV=0 when TB transmission is prepared (according to the time when TB occurs). In addition, the base station must perform blind decoding (BD) on which TO among the TOs corresponding to RV=0 the first transmission is performed.

As mentioned above, when RV pattern 2 or 3 is configured, the number of TOs corresponding to RV=0 may increase to increase the number of TOs that can be initially transmitted, and accordingly, uplink transmission latency may decrease. However, when RV pattern 2 or 3 is configured, the BS needs to perform BD, so BD-related complexity may increase.

Embodiment 1

Embodiment 1 relates to a method of reducing complexity for performing BD of a base station by limiting a TO that can be initially transmitted.

As the CG PUSCH repeated transmission process is extended from the S-TRP environment (i.e., the S-TRP transmission process) to the M-TRP environment (i.e., the M-TRP transmission process), it may be unclear at which TRP the initial transmission starts.

Figure 10:
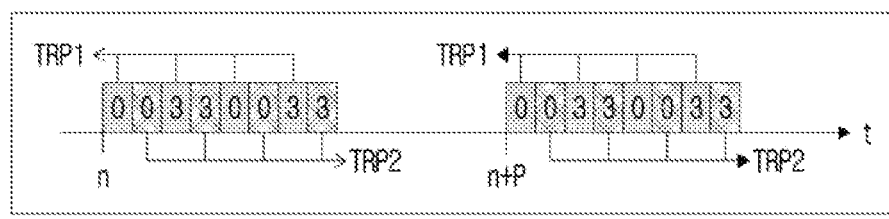
FIG. 10 is a diagram for describing a CG PUSCH repeated transmission operation according to an embodiment of the present disclosure.

For example, as shown in FIG. 10, when performing CG PUSCH repetition operation by cyclically mapping UL spatial relation RS 1 (i.e., UL Tx Beam 1) and UL spatial relation RS 2 (i.e., UL Tx Beam 2) to N TOs for repeated transmission, it is assumed that the number of repetitions (N) is configured to 8 and the RV pattern is configured to 2.

In FIG. 10, the TO corresponding to RV=0 is the 1st, 2nd, 5th, and 6th TO out of 8 repeatedly transmitted TOs, and among them, the 1st and 5th TOs are transmitted as TRP 1, and the 2nd and 6th TOs are transmitted as TRP 2. Since the UE can perform initial transmission in any TO among 1st, 2nd, 5th, and 6th TOs, it may perform initial transmission with TRP 1, and may perform initial transmission with TRP 2 as well.

Accordingly, the base station should perform BD in which TRP was initially transmitted, and in which TO of the corresponding TRP, BD should be performed first. In the case of performing the CG PUSCH repetitive operation in the S-TRP environment, since there is one TRP, the base station does not need to perform BD with which TRP was initially transmitted. Accordingly, when the CG PUSCH repetition operation is performed in the M-TRP environment, the complexity of the base station may increase. Hereinafter, Embodiment 1 for solving this problem will be described.

The UE may perform the first transmission only in the TO corresponding to the first spatial relation RS (i.e., the first TRP or/and the first UL Tx beam) among the TOs corresponding to RV=0, and may not perform the first transmission in the TO corresponding to the second spatial relation RS (i.e. second TRP or/and second UL Tx beam).

Alternatively, the UE may perform the initial transmission only in the TO corresponding to the second spatial relation RS among the TOs corresponding to RV=0, and may not perform the initial transmission in the TO corresponding to the first spatial relation RS.

Alternatively, the base station may indicate/configure whether to perform the first transmission in the TO corresponding to which TRP for the UE.

Here, although FIG. 10 exemplifies a case in which RV pattern 2 is configured, the above description may be applied as it is when RV pattern 3 is configured.

As another example, it may be fixedly configured to RV pattern 1 for PUSCH transmitted through the second TRP, and may be configured to one of RV patterns 1, 2, and 3 for PUSCH transmitted through the first TRP. Accordingly, when the RV pattern of the PUSCH transmitted in the first TRP is configured to 2 or 3, the UE may perform initial transmission in the TO corresponding to RV=0 among the TOs corresponding to the first TRP.

Embodiment 2

Embodiment 2 relates to a method of freely selecting a TO for performing initial transmission in order to reduce latency when RV pattern 1 is configured.

When RV pattern 1 is configured when performing S-TRP-based CG PUSCH repeated transmission, the number of TOs corresponding to RV=0 is limited. However, when RV pattern 1 is configured in the process of performing repeated M-TRP-based CG PUSCH transmission, since the TO corresponding to RV=0 is configured in each TRP, the number of TOs corresponding to RV=0 can be increased (doubled).

Therefore, when RV pattern 1 is configured when performing repeated M-TRP-based CG PUSCH transmission, similar to RV pattern 2 or 3, initial transmission may be performed in one of TO corresponding to RV=0 among N TOs configured for repeated transmission, and accordingly, latency may be reduced.

At this time, the base station should perform the BD in which TRP the initial transmission was performed, and in which TO of the corresponding TRP, the BD should be performed. If the RV pattern is configured for each TRP (e.g., RV pattern 1 is configured in one TRP and RV pattern 2 or 3 is configured in the other TRP), initial transmission may be performed in one of TO corresponding to RV=0 in RV pattern 1 and TO corresponding to RV=0 in RV pattern 2 or 3.

As another example, if RV pattern 1 is configured when performing repeated M-TRP-based CG PUSCH transmission, the UE may perform initial transmission in one of the first TOs of each TRP among N repeatedly transmitted TOs. That is, the UE may perform initial transmission in one of the first TO corresponding to TRP 1 and the first TO corresponding to TRP 2, and thus latency may be reduced.

As another example, even when the RV pattern is configured to 2 or 3, an enabler capable of restricting initial transmission to be performed in N repeatedly transmitted TOs may be utilized. When this indicator is 'ON' and M-TRP-based CG PUSCH repetition is configured, the initial transmission may be performed in one TO of the first TO corresponding to TRP 1 and the first TO corresponding to TRP 2 among N repeatedly transmitted TOs, and thus latency may be reduced.

Embodiment 3

Embodiment 3 relates to a method for the UE to perform initial transmission when the RV pattern is configured differently for each TRP.

When the RV pattern of TRP 1 and the RV pattern of TRP 2 are configured differently, ambiguity may occur when determining how to perform the initial transmission.

For example, if RV pattern 1 is configured for TRP 1 and RV pattern 2 or 3 is configured for TRP 2, it may be ambiguous whether to use an initial transmission performing method corresponding to RV pattern 1 or an initial transmission performing method corresponding to RV pattern 2 or 3.

To solve this, when the RV pattern is configured differently for each TRP, an initial transmission method corresponding to RV pattern 1 may be used. As another example, when the RV pattern is configured differently for each TRP, an initial transmission method corresponding to RV pattern 2 or 3 may be used.

In the above-described problem and embodiment, the spatial relation RS may be applied by replacing the UL Tx beam or the UL Tx beam reference RS defined in the UL TCI or UL TCI.

When the CORESET pool is configured, a TO that can be transmitted for the first time may be determined according to which CORESET pool the DCI that activates the type 2 CG PUSCH is transmitted from.

For example, when DCI is transmitted from a CORESET belonging to a CORESET pool having a pool index of 0, initial transmission may be restricted to only the TO corresponding to the first beam among the two UL Tx beams.

As another example, when DCI is transmitted from a CORESET belonging to a CORESET pool having a pool index of 1, initial transmission may be limited to a TO corresponding to the second beam among the two UL Tx beams.

For example, by using the method described above in Embodiment 1, it may be determined whether initial transmission is possible in the TO corresponding to which Tx beam among the TOs corresponding to the two Tx beams.

The CORESET pool and TRP can have a one-to-one correspondence. As a result, in CORESET pool 0, TRP 1 may use for DCI transmission, and CORESET pool 1 can may TRP 2 for DCI transmission. Therefore, it may be interpreted that the TRP corresponding to the CORESET pool in which the CG PUSCH is activated schedules the CG PUSCH. At this time, the initial transmission is allowed in the PUSCH TO toward the TRP, and repeated transmission is possible in the remaining TOs.

In the case of Type 1 CG PUSCH, since it is activated through RRC signaling, there is no DCI activation operation. Therefore, when the type 1 CG PUSCH is configured, the CORESET pool index may be additionally indicated through the RRC signal for the above-described operation.

Embodiment 4

Embodiment 4 relates to a method of interpreting the meaning of N in M-TRP-based CG PUSCH when the maximum number of repetitions is configured to N.

For example, N may mean the maximum number of repetitions for each UL Tx beam. That is, when N is configured to 4, it may be repeatedly transmitted up to 4 times for each UL Tx beam, and may be repeatedly transmitted up to 8 times. Additionally, in this case, the number of actual repeated transmissions per UL Tx beam may be equally limited.

For example, referring to FIG. 10, it is assumed that transmission is performed in three TOs (i.e., TOs to which RV value 033 is mapped) as initial transmission is performed to the 6th TO in the TO that can perform 8 repeated transmissions (i.e., TO mapped RV value 00330033). In this case, the UL Tx beam 1 is transmitted once, but the UL Tx beam 2 is transmitted twice, so that each TRP may receive a PUSCH of a different repetition number. When the number of repetitions is different for each beam, beam diversity obtainable through the full repetition PUSCH may be reduced.

Accordingly, the actual number of repeated transmissions for each beam may be limited to the same value. Alternatively, the actual number of repeated transmissions for each beam may be configured to a different value. Accordingly, the TO at which the repetitive transmission starts and the TO at which the repetitive transmission ends may be freely configured. The above-described operation may be indicated by the base station to the UE through signaling such as RRC.

As another example, N may mean the maximum number of repetitions without distinction of UL Tx beams. That is, when N is configured to 4, transmission may be repeated up to 2 times for each beam, and a total of 4 repetitions may be transmitted. Additionally, the actual number of repetitions for each beam may be equally limited or may be configured to different values.

Figure 11:
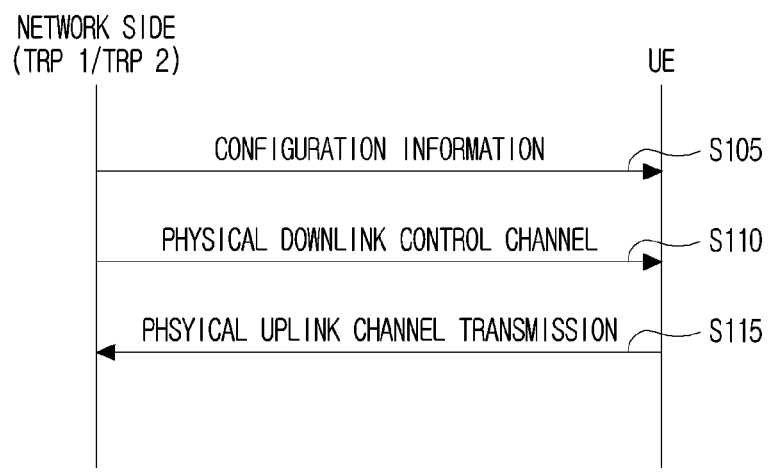
FIG. 11 is a diagram for describing a signaling procedure of a network side and a terminal according to the present disclosure.

FIG. 11 is a diagram for describing a signaling procedure of a network side and a UE according to an embodiment of the present disclosure.

FIG. 11 represents an example of signaling between UE and a network side to which the above-described examples of the present disclosure (e.g., embodiment 1/embodiment 2/embodiment 3/embodiment 4, or a combination of one or more of the detailed examples thereof) may be applied.

Figure 12:
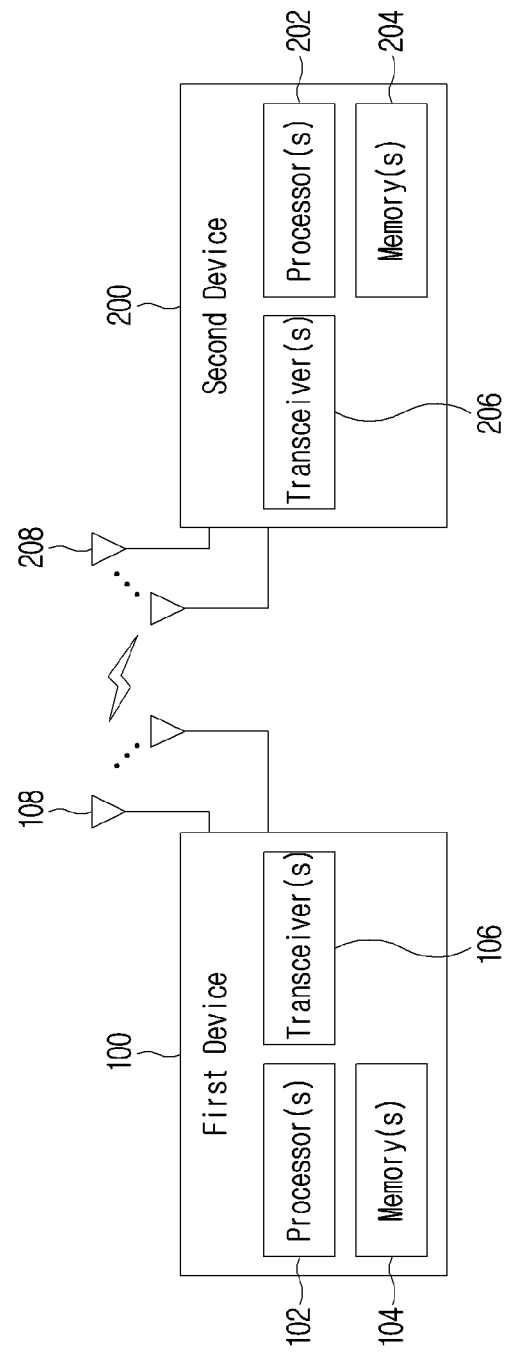
FIG. 12 illustrates a block diagram of a wireless communication system according to an embodiment of the present disclosure.

Here, UE/a network side is illustrative and may be applied by being substituted with a variety of devices as described by referring to FIG. 12. FIG. 11 is for convenience of description, and it does not limit a scope of the present disclosure. In addition, some step(s) shown in FIG. 11 may be omitted according to a situation and/or a configuration, etc. In addition, the above-described uplink transmission and reception operation, a MTRP-related operation, etc. may be referred to or used for an operation of a network side/UE in FIG. 11.

In the following description, a network side may be one base station including a plurality of TRPs or may be one cell including a plurality of TRPs. Alternatively, a network side may include a plurality of RRHs (remote radio head)/RRUs (remote radio unit). In an example, an ideal/non-ideal backhaul may be configured between TRP 1 and TRP 2 configuring a network side. In addition, the following description is described based on a plurality of TRPs, but it may be equally extended and applied to transmission through a plurality of panels/cells and may be extended and applied to transmission through a plurality of RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one UE. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

UE may receive configuration information through/by using TRP1 and/or TRP2 from a network side S105.

The configuration information may include information related to the CORESET pool. The configuration information may include information related to a network-side configuration (i.e., TRP configuration), resource allocation information related to M-TRP-based transmission and reception, and the like. The configuration information may be transmitted through a higher layer (e.g., RRC, MAC CE). The configuration information may include information related to uplink transmission based on a configured grant (CG). In addition, when the configuration information is predefined or configured, the corresponding step may be omitted.

For example, the configuration information may include CORESET-related configuration information (e.g., ControlResourceSet IE) as described in the above-described methods (e.g., at least one of Embodiment 1, Embodiment 2, Embodiment 3, Embodiment 4, or a combination of one or more of the detailed examples thereof). The CORESET-related configuration information may include a CORESET-related ID (e.g., controlResourceSetID), an index of a CORESET pool for CORESET (e.g., CORESETPoolIndex), time/frequency resource configuration of CORESET, TCI information related to CORESET, etc.

For example, an operation that UE (100 or 200 in FIG. 12) in the above-described stage S105 receives the configuration information from a network side (200 or 100 in FIG. 12) may be implemented by a device in FIG. 12 which will be described after. For example, in reference to FIG. 12, at least one processor 102 may control at least one transceiver 106 and/or at least one memory 104, etc. to receive the configuration information and at least one transceiver 106 may receive the configuration information from a network side.

One or more physical downlink control channels (PDCCH) may be transmitted to the UE through/using TRP 1 and/or TRP 2 to the network side (S110). For example, the UE may receive one or more PDCCHs via/using TRP1 and/or TRP 2 towards the network side. However, when the type 1 CG PUSCH is configured, step S110 may be omitted.

TRP 1 and/or TRP 2 may transmit to the UE by repeating/dividing the PDCCH including the same DCI. That is, the PDCCH transmitted by TRP 1 and/or TRP 2 may schedule the same channel.

For example, the operation of receiving the PDCCH by the UE (100 or 200 in FIG. 12) of the above-described step S110 to the network side (200 or 100 in FIG. 12) may be implemented by the apparatus of FIG. 13 to be described below. For example, referring to FIG. 13, the one or more processors 102 may control one or more transceivers 106 and/or one or more memories 104, etc. to receive the PDCCH, and the one or more transceivers 106 may receive the PDCCH from the network side.

The UE may transmit a physical uplink channel to the network side (S115). For example, the UE may transmit a physical uplink channel to the network side based on the configured grant. As another example, when the Type 2 CG PUSCH is configured, the UE may transmit a physical uplink channel scheduled (or activated) by the PDCCH (or DCI transmitted through the PDCCH) to the network side.

For example, the operation of the UE (100 or 200 in FIG. 12) transmitting a physical uplink channel in step S115 described above may be implemented by the apparatus of FIG. 13 below. For example, referring to FIG. 12, the one or more processors 102 may control one or more transceivers 106 and/or one or more memories 104 to transmit a physical uplink channel, and the one or more transceivers 106 may transmit a physical uplink channel to a network side.

General Device to which the Present Disclosure May be Applied

FIG. 12 is a diagram which illustrates a block diagram of a wireless communication system according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a user equipment (UE), configuration information related to uplink transmission based on a configured grant (CG) from a base station, the configuration information including first information related to an initial uplink transmission of a transport block (TB); and
based on the first information being set to 'off', starting, by the UE, the initial uplink transmission of the TB at a first transmission occasion (TO) among a plurality of TOs,
wherein the plurality of TOs are associated with a first sounding reference signal (SRS) resource set and a second SRS resource set, and
wherein based on the first information being set to 'on', the initial uplink transmission of the TB starts at a first TO associated with a redundancy version (RV) which is 0 corresponding to the first SRS resource set among the plurality of TOs, or at a first TO associated with a RV which is 0 corresponding to the second SRS resource set among the plurality of TOs.

2. The method of claim 1, wherein:
a RV sequence {0, 2, 3, 1} or {0, 3, 0, 3} is configured for the UE.

3. The method of claim 1, wherein:
the uplink transmission based on the CG is activated by a downlink control channel (DCI).

4. The method of claim 1, wherein:
a maximum repetition number of uplink transmission of the TB is configured by at least one of (radio resource control (RRC) signaling or DCI received from the base station.

5. The method of claim 1, wherein:
the uplink transmission includes a physical uplink shared channel (PUSCH) transmission.

6. A user equipment (UE) comprising:
at least one transceiver; and
at least one processor connected to the at least one transceiver,
wherein the processor is configured to:
receive, through the at least one transceiver, configuration information related to uplink transmission based on a configured grant (CG) from a base station, the configuration information including first information related to an initial uplink transmission of a transport block (TB); and
based on the first information being set to 'off', start the initial uplink transmission of the TB at a first transmission occasion (TO) among a plurality of TOs,
wherein the plurality of TOs are associated with a first sounding reference signal (SRS) resource set and a second SRS resource set, and
wherein based on the first information being set to 'on', the initial uplink transmission of the TB starts at a first TO associated with a redundancy version (RV) which is 0 corresponding to the first SRS resource set among the plurality of TOs, or at a first TO associated with a RV which is 0 corresponding to the second SRS resource set among the plurality of TOs.

7. A method comprising:
transmitting, by a base station, configuration information related to uplink transmission based on a configured grant (CG) to a user equipment (UE), the configuration information including first information related to an initial uplink reception of a transport block (TB); and
based on the first information being set to 'off', performing, by the base station, the initial uplink reception of the TB at a first transmission occasion (TO) among a plurality of TOs,
wherein the plurality of TOs are associated with a first sounding reference signal (SRS) resource set and a second SRS resource set, and
wherein based on the first information being set to 'on', the initial uplink reception of the TB starts at a first TO associated with a redundancy version (RV) which is 0 corresponding to the first SRS resource set among the plurality of TOs, or at a first TO associated with a RV which is 0 corresponding to the second SRS resource set among the plurality of TOs.

8. A base station comprising:
at least one transceiver; and
at least one processor connected to the at least one transceiver,
wherein the processor is configured to:
transmit, through the at least one transceiver, configuration information related to uplink transmission based on a configured grant (CG) to a user equipment (UE), the configuration information including first information related to an initial uplink reception of a transport block (TB); and
based on the first information, being set to 'off', perform the initial uplink reception of the TB at a first transmission occasion (TO) among a plurality of TOs, wherein the plurality of TOs are associated with a first sounding reference signal (SRS) resource set and a second SRS resource set, and wherein based on the first information being set to 'on', the initial uplink reception of the TB starts at a first TO associated with a redundancy version (RV) which is 0 corresponding to the first SRS resource set among the plurality of TOs, or at a first TO associated with a RV which is 0 corresponding to the second SRS resource set among the plurality of TOs.

9. A processing device configured to control a user equipment (UE), the processing device comprising:

at least one processor; and at least one computer memory operatively coupled to the at least one processor and storing instructions for performing operations upon being executed by the at least one processor, wherein the operations comprise:

receiving configuration information related to uplink transmission based on a configured grant (CG) from a base station, the configuration information including first information related to an initial uplink transmission of a transport block (TB); and based on the first information being set to 'off', starting the initial uplink transmission of the TB at a first transmission occasion (TO) associated with a plurality of TOs, wherein the plurality of TOs are associated with a first sounding reference signal (SRS) resource set and a second SRS resource set, and wherein based on the first information being set to 'on', the initial uplink transmission of the TB starts at a first TO associated with a redundancy version (RV) which is 0 corresponding to the first SRS resource set among the plurality of TOs, or at a first TO associated with a RV which is 0 corresponding to the second SRS resource set among the plurality of TOs.

10. At least one non-transitory computer readable medium storing at least one instruction, wherein:

the at least one instruction executed by at least one processor controls a device which performs uplink transmission in a wireless communication system to perform:

receiving configuration information related to uplink transmission based on a configured grant (CG) from a base station, the configuration information including first information related to an initial uplink transmission of a transport block (TB); and based on the first information being set to 'off', starting the initial uplink transmission of the TB at a first transmission occasion (TO) associated with a plurality of TOs, wherein the plurality of TOs are associated with a first sounding reference signal (SRS) resource set and a second SRS resource set, and wherein based on the first information being set to 'on', the initial uplink transmission of the TB starts at a first TO associated with a redundancy version (RV) which is 0 corresponding to the first SRS resource set among the plurality of TOs, or at a first TO associated with a RV which is 0 corresponding to the second SRS resource set among the plurality of TOs.

* * * * *